United States Patent Office 2,823,997
Patented Feb. 18, 1958

2,823,997

PIGMENT, PAPER CONTAINING THE SAME AND METHOD OF PREPARATION

William L. Craig, Westport, Conn., assignor to R. T. Vanderbilt Company, Inc., New York, N. Y., a corporation of New York No Drawing. Application November 25, 1953
Serial No. 394,485

7 Claims. (Cl. 92—3)

My invention relates to improvements in the manufacture of pigments and includes the pigments so produced.

In my prior United States Patent No. 2,599,094, issued June 3, 1952, I have described gelatinized cellulosic fibrous hydrated calcium silicate pigments which are useful in the manufacture of paper and for other purposes. The pigments can be prepared by subjecting, at ordinary temperatures, an aqueous suspension of cellulosic fibers to the action of a solution of calcium chloride until the calcium chloride brings about a gelatinization of the cellulosic fibers. Thereafter, a solution of sodium silicate is added to the suspension of the gelatinized cellulosic fibers containing the calcium chloride to react therewith and precipitate finely-divided hydrated calcium silicate in and on the fibers. The amount of calcium chloride in the solution and the amount of sodium silicate added are such that the amount of precipitated hydrated calcium silicate remaining in and on the fibers is in excess of the weight of the fibers.

In accordance with my present invention, I have discovered that novel pigments having unique and advantageous properties for certain purposes including paper manufacture can be prepared by treating with alum the pigments described and claimed in my prior patent. The treatment with alum is performed in such manner as to provide a finished reaction product which when dispersed in water provides a mixture having a pH within the range from 4 to 9.

The following examples set forth details concerning the manufacture of my new pigments and are to be considered as not limitative of the invention.

EXAMPLE I 400 pounds of bleached sulfite pulp is beaten at 3 percent consistency until the freeness is 400 Canadian. 640 pounds of flake calcium chloride containing 20–23 percent by weight of water of hydration is then added and beating is continued until the freeness is 350 Canadian. This treatment results in a swelling and hydration and gelatinization of the fibers. Thereafter, a solution composed of 1300 gallons of water and 3860 pounds of a standard water glass silicate having a sodium oxide to silicon dioxide ratio of approximately 1:3.25 and containing 37.5 percent by weight of solids (sodium oxide plus silicon dioxide) is added with agitation. The sodium silicate reacts with the calcium chloride in and on and around the fibers and a sufficient period of time (10 to 15 minutes) is allowed to secure full precipitation.

Several batches of pigment prepared as described are slurried at 10 percent consistency in water and treated with various amounts of dry powdered alum, $Al_2(SO_4)_3.14H_2O$. Each batch contains 12.5 grams of the pigment and is treated with alum varying from 10 percent to 120 percent, based upon the weight of the pigment. After the addition of the alum, each batch is mixed for two hours with slow agitation and is filtered, dried and weighed. The pH values of 10 percent by weight aqueous suspensions of the dried alum treated pigments are also obtained. The results are set forth in Table I below:

Table I

| Gm. Alum added | Wt. Alum Treated Pigment, Gm. | 10% Slurry pH |
|---|---|---|
| 0 | 12.1 | 10.0 |
| 2 | 12.4 | 9.5 |
| 4 | 12.3 | 8.9 |
| 6 | 14.5 | 5.5 |
| 8 | 15.6 | 4.3 |
| 10 | 16.8 | 4.1 |
| 12 | 16.5 | 4.0 |
| 15 | 16.2 | 4.0 |

EXAMPLE II

In this example alum treated pigments are prepared by following the procedure set forth in Example I, with the exception that bleached kraft pulp is used, beaten to a freeness of 367 Canadian before the addition of the water glass silicate. Alum treated pigments are also prepared using the procedure set forth in the preceding sentence, with the exception that this particular pigment is washed with water to remove salt before the addition of alum. In the case where the alum is added before washing to remove sodium chloride, as in Example I, 32.5 grams of alum is required per 50 grams of pigment before alum treatment to reach a pH of 4.8 when dispersed in water. After washing, the pH of a water dispersion of this pigment is 5.2. In the case where the pigment not treated with alum is washed first and then alum treated, 28.25 grams of alum per 50 grams of pigment not treated with alum is required in order for an aqueous dispersion of the alum treated pigment to reach a pH of 5.1.

Handsheet trials at a pH of 5 on the wire are made with 65:35 unbleached ground wood to bleached kraft stock containing sufficient pigment to obtain a total ash of 8 percent. Thus, 8,000 ml. of 65:35 stock at an air dry consistency of 0.245 percent is measured out and sufficient pigment is added to obtain a 34 pound sheet with a total ash of 8 percent. The amount of pigment is previously determined by making 34 pound test sheets with various percentages of pigment and fiber. In making the sheets, the standard TAPPI method is used, and one ml. of 10 percent alum solution is added to the stock in the sheet mold to obtain the desired pH on the wire. Other pertinent data concerning the manner in which the tests are made are set forth in Table IIA below.

Table IIA

|  | Percent Dry Pigment on Air Dry Fiber | Gms. Air Dry Fiber | Gms. Dry Pigment | Gms. of Pigment Before Alum Treatment Slurry | Gms. Commercial Pigment Slurry | pH in Sheet Mold | Vol. of Dilute Filled Stock Used Per Sheet (cc.) |
|---|---|---|---|---|---|---|---|
| Control | 0 | 19.6 | | | | 5.0 | 355 |
| Pigment—Alum Treated and Washed | 21.0 | 19.6 | 4.11 | 204 | | 5.0 | 350 |
| Pigment—Washed and Alum Treated | 21.5 | 19.6 | 4.21 | 215 | | 4.9 | 365 |
| Commercial Pigment | 19.0 | 19.6 | 3.72 | | 130 | 4.8 | 385 |

Notes:
(1) Both pigments were made at 81% dry pigment and 19% dry fiber.
(2) The pigment alum treated and then washed was added to the dilute stock at 2.49% bone dry consistency.
(3) The pigment washed and then alum treated was added to the dilute stock at 2.42% bone dry consistency.
(4) The commercial pigment slurry was used at a bone dry consistency of 2.86% and was a white, extremely finely divided, precipitated, hydrated calcium silicate.

Table IIB sets forth the results on the conditioned handsheets:

Table IIB
TESTS ON CONDITIONED SHEETS

|  | Basis Wgt. 25x38 —500 | G. E. Brightness | | B&L Opacity | Corrected Opacity, Kubelka-Munk | Caliper, Pts. | Bulk, Pts./Lb. | Dry Tear (Elmendorf) | Percent Total Ash |
|---|---|---|---|---|---|---|---|---|---|
|  |  | Felt | Wire |  |  |  |  |  |  |
| Control | 34.6 | 55.9 | 55.2 | 87.0 | 87.3 | 3.74 | .108 | 24.4 | 0.76 |
| Pigment—Alum Treated and Washed | 34.1 | 67.1 | 68.3 | 90.7 | 91.2 | 3.79 | .111 | 29.2 | 8.90 |
| Pigment—Washed and Alum Treated | 35.0 | 66.2 | 67.6 | 90.8 | 90.8 | 3.84 | .110 | 30.0 | 7.96 |
| Commercial Pigment | 35.6 | 62.4 | 63.0 | 90.0 | 89.7 | 4.14 | .116 | 27.2 | 7.88 |

Various modifications can be made in the specific procedures described above to prepare other pigments which fall within the scope of my invention. Such pigments are prepared by using as a starting material those described in my Patent No. 2,599,094. In general, the pigments of my patent are a highly-pigmented cellulosic pulp comprising the dried residue of swollen, hydrated and gelatinized cellulosic fibers and an amount of finely-divided pigment in excess of the dry weight of the fibers but not exceeding about nine times the dry weight of the fibers. The pigment portion of the highly-pigmented cellulosic pulp of my patent consists of precipitated, hydrated calcium silicate in finely-divided form which is largely within the dried residue of the cellulosic fibers and also on and around the fibers. This finely-divided pigment which is within the fibers is precipitated in situ therein by reaction of calcium chloride with sodium silicate while the calcium chloride is within the fibers while they are in a swollen, hydrated and gelatinized state. The highly-pigmented cellulosic pulp of my patent forms a pulp-like mass on admixture with water.

The pigment or highly-pigmented cellulosic pulp of my Patent No. 2,599,094 can be prepared using as a starting material any of a wide variety of cellulosic pulp fibers including chemical, semi-chemical or mechanical pulp fibers used in paper making, such as kraft, sulfite, and soda pulp (chemical pulp) or groundwood (mechanical pulp). The fibers treated can be bleached or unbleached stock and can be stock which has been previously refined in a beater or refining engine or which may be unrefined stock or which may be subjected to beating or refining in connection with the treatment of the pulp to produce the new fibrous pigment.

In accordance with my patent, the pulp can be treated in the form of a concentrated stock containing, for example, around 4 percent or 6 percent or more of fibers (dry basis) and calcium chloride can be added advantageously in the form of dry calcium chloride in an amount equal to or advantageously in excess of the weight of the fibrous stock (dry basis). With stock containing around 4 percent or 6 percent of fibers (dry basis), the amount of calcium chloride is advantageously such as to form a solution of, for example, 10 percent, 15 percent or 20 percent or more. A more dilute calcium chloride solution can be used, for example, a solution containing 5 percent to 10 percent calcium chloride, with prolonged mechanical treatment or beating to effect hydration and swelling and gelatinization of the fibers. With strong calcium chloride solutions, for example, around 13 percent to 20 percent, a modification of the cellulosic fibers takes place in a short period of time, for example, 5 to 15 minutes, with proper agitation. The fibers become more or less gelatinous and transparent in appearance.

Still in accordance with my Patent No. 2,599,094, after treatment of the pulp fibers with calcium chloride, the stock is treated with a solution of sodium silicate, such as water glass, usually in the form of a 10 percent or 20 percent solution in sufficient amount to react with the calcium chloride and precipitate insoluble hydrated calcium silicate largely within and also on and around the modified fibers. The amount of added sodium silicate is equal to or somewhat more or less than the amount which is sufficient to react with all of the calcium chloride used. The fibrous pigment produced in accordance with my Patent No. 2,599,094 retains the finely-divided precipitated calcium silicate in amount greatly exceeding the amount of fibers treated (dry basis) and advantageously in amount 3 or 4 or 5 times the dry weight of the fibers, or even a higher percentage, for example, around 15 percent fiber (dry basis) and 85 percent precipitated, hydrated calcium silicate or 10 percent fiber (dry basis) and 90 percent precipitated, hydrated calcium silicate.

I claim:

1. A new composition of matter suitable for use as a pigment, said composition being a reaction product of aluminum sulfate and a highly-pigmented cellulosic pulp comprising swollen, hydrated and gelatinized cellulosic fibers and an amount of finely-divided pigment in excess of the dry weight of the fibers, and not exceeding about nine times the dry weight of the fibers, the finely-divided pigment being precipitated, hydrated calcium silicate, the calcium silicate being largely within the cellulosic fibers and also on and around said fibers, the calcium silicate within the fibers having been precipitated in situ therein by reaction of calcium chloride with sodium silicate while the calcium chloride is within the fibers while they are in a swollen, hydrated and gelatinized state, said highly-pigmented cellulosic pulp forming a pulp-like mass on admixture with water, said reaction product when dispersed in water to form a mixture containing 10 percent by weight of said reaction product yielding a mixture having a pH within the range 4 to 9.

2. A new composition of matter suitable for use as a pigment, said composition being a reaction product of aluminum sulfate and a highly-pigmented cellulosic pulp comprising swollen, hydrated and gelatinized cellulosic fibers and finely-divided pigment, the finely-divided pigment comprising precipitated, hydrated calcium silicate, the calcium silicate being largely within the cellulosic fibers and also on and around said fibers, the calcium silicate within the fibers having been precipitated in situ therein by reaction of a soluble calcium salt with a soluble silicate while the calcium salt is within the fibers while they are in a swollen, hydrated and gelatinized state, said highly-pigmented cellulosic pulp forming a pulp-like mass on admixture with water.

3. A paper sheet comprising pulp fibers and the pigment described in claim 1 in an amount which will improve the properties of the paper.

4. A paper sheet comprising pulp fibers and the pigment described in claim 2 in an amount which will improve the properties of the paper.

5. The method of producing a paper sheet containing pulp fibers which comprises reacting aluminum sulfate in a liquid medium with agitation with a highly-pigmented cellulosic pulp comprising swollen, hydrated and gelatinized cellulosic fibers and finely-divided pigment, the finely-divided pigment comprising precipitated, hydrated calcium silicate, the calcium silicate being largely within the cellulosic fibers and also on and around said fibers, the calcium silicate within the fibers having been precipitated in situ therein by reaction of a soluble calcium salt with a soluble silicate while the calcium salt is within the fibers while they are in a swollen, hydrated and gelatinized state, the amount of said aluminum sulfate being sufficient to precipitate a product of the reaction thereof with said calcium silicate and adding said aluminum sulfate-treated pulp to said paper-forming pulp fibers in an amount which will improve the properties of said paper, and producing a paper sheet from said paper-forming pulp fibers.

6. The method of claim 5 wherein the amount of pulp fibers in said liquid medium during the reaction is not greater than the amount of calcium silicate, and the amount of aluminum sulfate is such that when the aluminum-sulfate treated pulp is dispersed in water to form a 10 percent by weight slurry, the slurry has a pH within the range 4 to 9.

7. The method of producing a fibrous pigment which comprises reacting calcium chloride with sodium silicate in an aqueous medium containing pulp fibers while the calcium chloride is within the pulp fibers while they are in a swollen, hydrated and gelatinized state to precipitate calcium silicate in situ within the fibers and also on and around said fibers, and to form sodium chloride, said calcium silicate and fibers constituting a highly pigmented cellulosic pulp, and reacting aluminum sulfate in said liquid medium with said highly pigmented cellulosic pulp in the presence of said sodium chloride, the amount of said aluminum sulfate being sufficient to precipitate a product of the reaction with said calcium silicate.

References Cited in the file of this patent

UNITED STATES PATENTS

| | | |
|---|---|---|
| 2,080,437 | Rafton | May 18, 1937 |
| 2,583,548 | Craig | Jan. 29, 1952 |
| 2,599,091 | Craig | June 3, 1952 |
| 2,599,092 | Craig | June 3, 1952 |
| 2,599,093 | Craig | June 3, 1952 |
| 2,599,094 | Craig | June 3, 1952 |
| 2,757,085 | Paquin | July 31, 1956 |